Dec. 10, 1963 H. KUHN 3,114,005

INBAND SIGNALING SYSTEM

Filed April 24, 1959 2 Sheets-Sheet 1

INVENTOR.
HENRY KUHN
BY
Lippincott & Ralls
ATTORNEYS

INVENTOR.
HENRY KUHN

BY

Lippincott & Ralls
ATTORNEYS

United States Patent Office 3,114,005
Patented Dec. 10, 1963

3,114,005
INBAND SIGNALING SYSTEM

Henry Kuhn, San Mateo, Calif., assignor to Lenkurt Electric Co., Inc., San Carlos, Calif., a corporation of Delaware Filed Apr. 24, 1959, Ser. No. 808,709
4 Claims. (Cl. 179—16)

Figure 1:
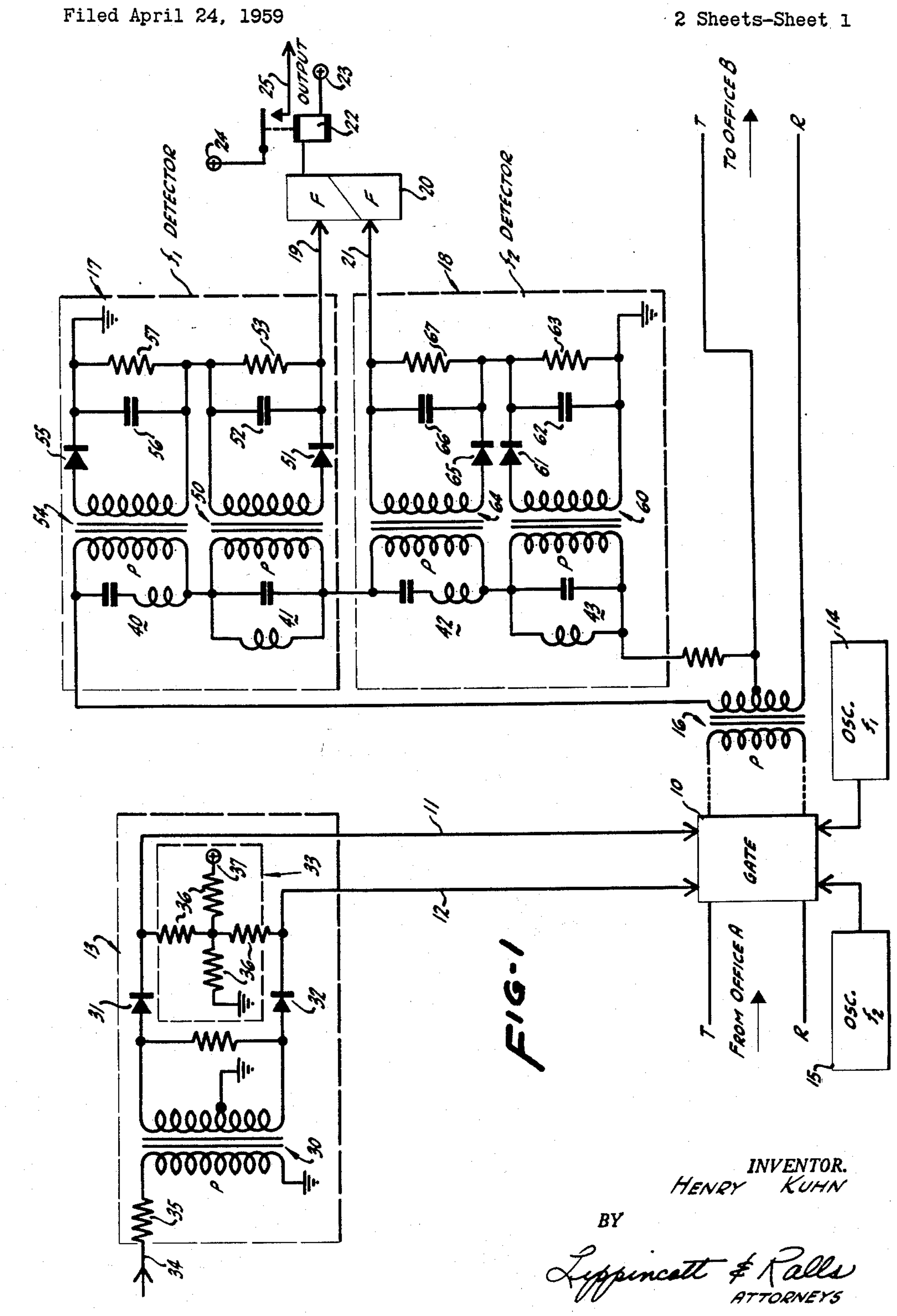

This invention relates to voice frequency signaling systems, and more particularly to inband signaling systems wherein a pair of frequencies are employed.

For many years in connection with transmission systems that carry voice signals it has been usual to employ various direct-current signaling techniques. In the early days of short haul telephone systems, these direct-current techniques worked moderately well since the transmission requirements were not severe. Even the additional means required for the direct-current out-of-band signaling systems between calling and called subscribers or a central office exchange were not inordinately expensive. However, these out-of-band signals had to be regenerated after the distances they traveled became too great. This regeneration could not be effected by the spaced repeaters used to amplify the voice signals since the amplifiers were designed to reject such interfering signals. Even with these disadvantages, however, direct-current signaling methods prove useful as long as distances are not too great and speed is not of the essence. The reality of direct toll dialing, however, has made direct-current signaling too uneconomical; correspondingly, it has placed the advantages of inband signal systems in bold relief. Here then, appeared a way to eliminate the need for regenerating the direct-current signals, since a signaling pulse that utilizes the voice transmission path will be amplified along with the voice signals. This not only eliminates separate repeaters or telegraph type regenerators but permits paths heretofore reserved for signaling to be freed for completing voice transmission paths.

In response to this need for inband signaling systems, a number of approaches have been taken. For example, a single frequency inband signaling system is proposed by A. Weaver and N. A. Newell in an article appearing in the Bell System Technical Journal, vol. 33, November 1954. This signaling system employs guard action to protect the receiver against operation on speech signals. This means that substantially all the frequencies in the voice band other than those in the narrow band centered on the signaling frequency are used to generate a voltage which opposes the signaling frequency voltage. The circuit components are chosen so that when signal frequency is present, it is sufficient to override the effect of the guard action channel and operate the receiver. Naturally enough, the amount of guard action is limited by the amount of noise in the circuit, since noise as well as voice frequency signals tend to oppose operation of the receiver. Beyond this particular guard action, of course, the more conventional techniques of preventing false operation on voice frequency signals are employed. That is, a highly peaked band pass filter is employed and a signal frequency in the upper end of the voice channel is selected. The latter because the higher the signaling frequency, the more unlikely it will be to be operated falsely by speech signals or noise.

This single frequency system has certain limitations. For one thing, it must be operated in connection with line relays which still have to be maintained in their energized condition between calls, and hence, the signaling voltage on the trunk circuit must be maintained. Then too, a single frequency system must be able to distinguish between the beginning and end of an incoming signaling pulse—by the use of a time delay mechanism of some sort.

The present invention constitutes a distinct improvement over single frequency inband signaling systems, in a broad sense, by employing two signaling frequencies. This permits a substantial simplification of the necessary circuitry and detecting equipment, not to mention a saving of electrical energy.

The present invention employs a transmitter for converting the incoming direct-current signals, which are dial pulses or other supervisory control pulses, to decaying positive and negative pulses. These pulses, in turn, are fed to a gate circuit bridging the voice transmission channel and operable to place one of two frequencies on the line. With this arrangement it can be seen that a direct-current pulse appearing at the input of the transmitter section will cause a burst of current of a first frequency to be applied to the transmission system, whereas, the disappearance of a direct-current pulse will cause a burst of current of a second frequency to be applied thereto. This arrangement permits the two conditions of direct-curernt signaling in a train of pulses wherein the durations of and intervals between pulses are short compared to the signal decay period to be represented by the first frequency (presence of pulse) and the second frequency (absence of pulse). At the signaled station, the time-displaced alternating current signaling voltages of the two frequencies are directed to frequency detectors. The appearance of the frequencies at their respective detectors causes output voltages to be developed. These output voltages drive any conventional bistable trigger circuit which then generates a train of signaling pulses comparable to the input pulses. This particular arrangement, wherein a pair of frequencies are employed, has a number of advantages over previous systems. It permits an inband alternating-current signaling system to be used that employs simple and straightforward circuit design. Where prior systems have had to carefully control various slow release and slow-operate relays or various other types of timing devices to detect the length or stopping point of an incoming pulse, the present invention permits detection to be tantamount to timing since the start of a pulse is indicated by one frequency and the end of the pulse by the other.

Therefore, an object of the present invention is to provide an inband signaling system for transmitting direct-current signal pulses that is simple, economical and efficient. Another object is to provide a system wherein timing requirements are minimized and it is unnecessary to maintain relays and other terminal equipment energized during non-switching periods.

In accordance with these objects, a feature of the invention pertains to the use of a pulse transformer for converting direct-current signal pulses to positive and negative pulses that decay in finite times for use in a gating circuit that places the proper frequency on the voice channel.

Another feature of the invention pertains to the use of a pair of closely-spaced frequencies in the upper end of the voice band for controlling detectors at a receiving station that includes signal and guard channels which, in turn, operate a direct-current signal generator that generates comparable output signal pulses.

Yet another feature of the invention pertains to the combination of means for generating a first and a second frequency, gating means responsive to the presence and absence of input signaling pulses to respectively apply said first and second frequencies to the voice transmission system, and receiving means selectively responsive to the first and second frequencies to regenerate the input signaling pulses.

Figures 2, 3, 4, 5:
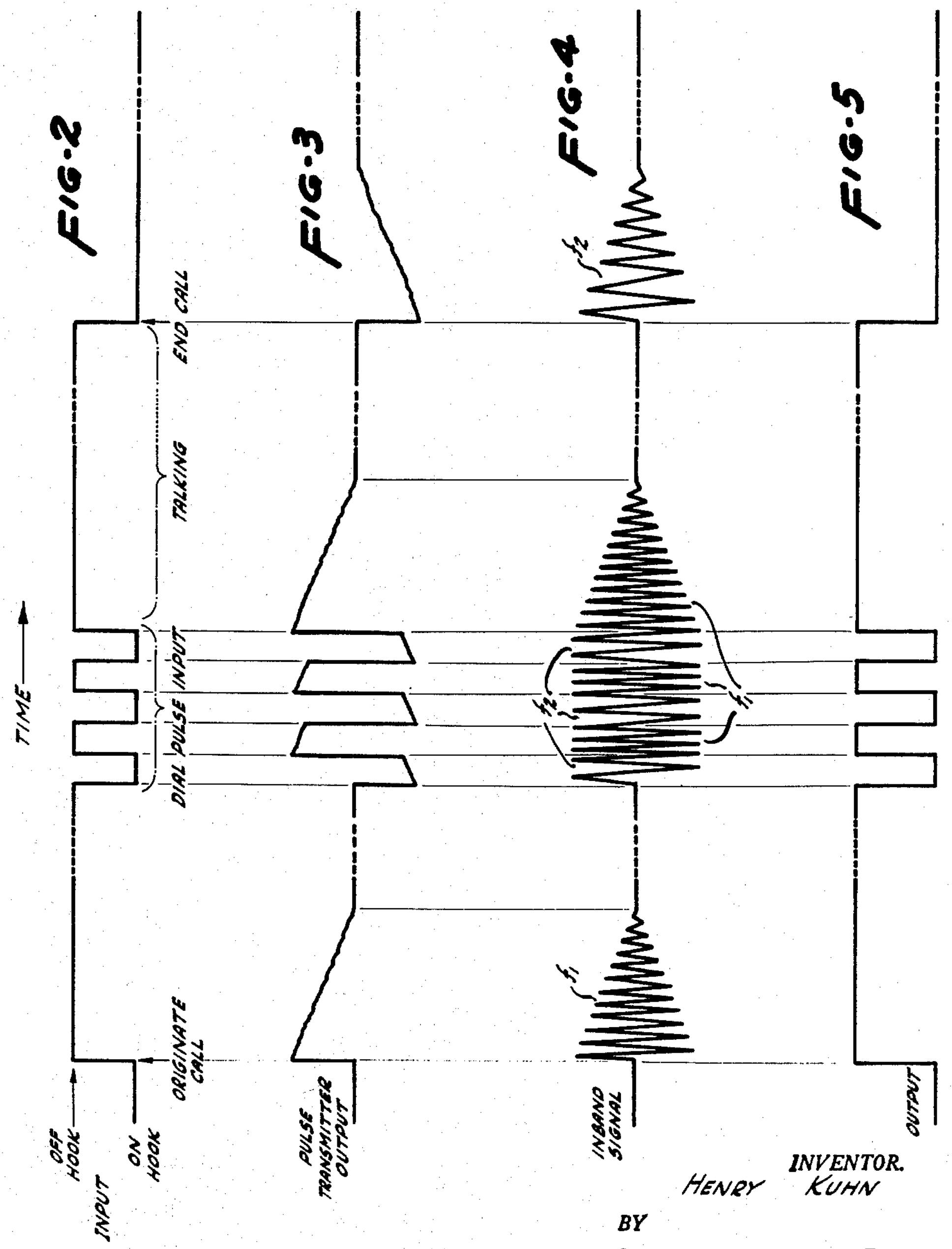

These and other objects and features will be more fully understood when the following detailed description is read with reference to the drawings in which:

FIG. 1 is a schematic diagram of a preferred embodiment of the present invention; and, FIGS. 2 through 5 are exemplary waveforms at various points in the system of FIG. 1, correlated along a time axis, more specifically;

FIG. 2 exemplifies a set of typical direct-current signal pulses applied to the input of the transmitter;

FIG. 3 exemplifies the output from the transmitter with the direct-current input signal of FIG. 2;

FIG. 4 illustrates the two frequency signal applied to the voice channel to represent the incoming signal of FIG. 2, and;

FIG. 5 exemplifies the regenerated direct-current pulses after transmission.

Looking more particularly at FIG. 1, it can be seen that the voice channel transmission system is represented by a pair of conductors connected to the tip (T) and ring (R) from a calling office A to a called office B remote therefrom, the broken line connections between gate 10 and transformer 16 in the drawing representing a circuit of any desired length between the two offices. A gate 10 is interposed between the T and R conductors (which however are not necessarily broken by the gate circuit but may be merely connected thereto) adjacent the office A and conductors 11 and 12 connect it to transmitter 13. Also connected to the gate 10 is an oscillator 14, generating the frequency $f_1$, and an oscillator 15, generating the frequency $f_2$. The gate circuit 10 operates to connect oscillators 14 and 15 selectively between conductors (T) and (R) responsive to pulses received over leads 11 and 12. The transmitter 13 converts incoming direct-current pulses on lead 34 to positive and negative pulses which control the operation of the gate 10 that, in turn, connects oscillators 14 and 15 to conductors T and R. Lead 34 is the conventional signal, control, or supervisory lead (S) customarily employed to transmit the supervisory signals—e.g., on-hook, off-hook, dial pulses, etc.—through a central office, lead 34 being such a supervisory lead from office A.

An isolation transformer 16 is provided at the receiving end of the exemplary inband signaling system of FIG. 1. One terminal of the secondary of the transformer 16 and the center tap are connected to the T and R leads proceeding to office B. Between the center tap of the output winding of the transformer 16 and the other terminal thereof are connected the frequency detectors 17 and 18. Detectors 17 and 18 detect the presence of frequencies $f_1$ and $f_2$, respectively. Any output of detector 17 is applied via lead 19 to one side of the bistable trigger circuit or flip-flop 20, whereas the output from detector 18 is applied via lead 21 to the other side of the trigger circuit 20. The two state trigger circuit 20 is caused to change states by the application of pulses from the detectors 17 and 18. In the state associated with detector 17, ground is supplied to one side of the winding of relay 22, the other side of which is connected to battery 23. This completes the circuit for the winding of relay 22 and, in operating, it closes its front contact 1 thereby placing battery 24 upon output lead 25. The release of relay 22, caused by a change in state of trigger circuit 20, removes battery 24 from output lead 25. Lead 25 is the conventional signal, control, or supervisory lead (S) extending into office B.

Having briefly described the parts of the dual frequency inband signaling system representing the core of the present invention, it is well to look in a little more detail at the various parts thereof. Looking more particularly at transmitter 13, it can be seen to include a transformer 30, a pair of diodes 31 and 32 and a source of bias 33. The direct-current signals which are to be transmitted to the remote receiver are incoming on supervisory lead 34 from office A and are applied through dropping resistor 35 to the primary of transformer 30. In the exemplary embodiment, the transformer 30 is a pulse transformer capable of reproducing square-waves down to a relatively few cycles. The output of transformer 30 is a slowly decaying square-wave which is, in turn, half rectified by diodes 31 and 32.

The input direct-current signal on lead 34 is exemplarily represented in FIG. 2, and the output wave form of transformer 30 is depicted in FIG. 3. Thus, as is characteristic with pulse transformers, even though a constant direct-current pulse is placed on its primary winding, the output wave form is initiated by the leading or trailing edge thereof, and decays within a finite time thereafter (see FIG. 3). The present invention takes advantage of this decay in a pulse transformer to eliminate the need for maintaining one of the frequencies on the line during the time the trunk is idle or in use. This feature of the invention will be more fully explained below.

The positive and negative half cycles of the square-wave output of transformer 30 are rectified by diodes 31 and 32, respectively, and applied via leads 11 and 12 to the gate 10. In the absence of signals on lead 34, diodes 31 and 32 are poled to present a high resistance to current flow, i.e., they have their bar terminals maintained positive with respect to their arrow terminals by bias supply 33, which includes a plurality of resistors 36 and a source of positive direct-current voltage 37. Whenever the leading edge of a positive-going direct-current signal pulse appears on lead 34 and it is translated through transformer 30 to the secondary thereof as a pulse, it reverses the polarity of voltage across diode 31 whereby the diode now presents a low resistance to current flow. This places the output pulse on lead 11. However, the output pulse decays due to the delay characteristic of the winding of transformer 30 and connected circuits. Even though the output pulse decays, diode 31 passes the pulse until the direct-current output from transformer 30 becomes substantially zero. Similarly, whenever the negative-going or trailing edge of a direct-current input signal on lead 34 is applied to the transformer 30, an output pulse is generated such that diode 32 has its arrow terminal driven positive with respect to the bar terminal, thereby permitting the pulse to reach lead 12. This pulse also decays slowly until the decay characteristic of the pulse transformer reduces it substantially to zero.

The output pulse on lead 11 acts through gate 10 to place the oscillator 14, which is tuned to frequency $f_1$, across the lines T and R. Alternately, the gate 10 responds to the output pulse on lead 12 to connect the oscillator 15, which is tuned to frequency $f_2$, across the transmission line including T and R. Thus, as the signaling information is transmitted to the remote receiver at transformer 16, it includes short bursts of current corresponding to frequencies $f_1$ and $f_2$. The signal intelligence is depicted in FIG. 4. It can be seen that when the dial tone equivalent is placed on lead 34 as a result of the calling party removing his receiver from the hook, a short burst of $f_1$ signal is placed on transmission lines T and R and it slowly decays in a finite time even though dial tone remains on lead 34. Then, when dial tone is interrupted preparatory to placing the first dial pulse on lead 34, a short burst of $f_2$ signal is placed on transmission lines T and R. This short burst of $f_2$ current does not have time to fully decay since the dial pulse starts a short time after dial tone was interrupted. That is, neither the dial pulses nor the intervals between them in the same pulse train are long compared to the decay characteristics of the transformer 30. Hence, before the $f_2$ signal has decayed to any extent, a burst of $f_1$ current representing the release of the first dial pulse occurs. This continues for the number of dial pulses involved. At the end of the last dial pulse, the $f_1$ current decays just as it did after the receiver was taken off the hook.

No further signal current flows during the subsequent time during which the calling and called parties complete their conversation. As soon as the conversation is over and one of the parties replaces the telephone hand set on the hook, the trailing edge of the direct-current signal on lead 34 generates an output pulse which appears on lead 12. This places a burst of $f_2$ current on the transmission line, as shown in FIG. 4, which slowly decays in accordance with the characteristics of the pulse transformer 30, as heretofore explained in connection with the bursts of $f_1$ current. The complete inband signal might look like the exemplary waveform of FIG. 4, although there would probably be many more dial pulses.

In a practical circuit, it is desirable that the frequencies $f_1$ and $f_2$ be chosen as close together as possible, consistent with bias distortion which occurs when oscillators having frequencies too close together are switched too rapidly. Then too, as noted above, it is desirable that the frequencies be as high in the voice band as possible to avoid false voice operation. In one exemplary circuit employed, the frequencies of 3100 and 3300 c.p.s. has been found to work satisfactorily. These keep bias distortion within permissible limits, and, at the same time, provide substantial protection against signal imitation by voice intelligence.

After the alternating-current signals have been transmitted over transmission lines T and R, they are detected at one side of the transformer 16, as mentioned above, and applied to four tuned circuits of the receiver which are serially connected. Two of the tank circuits are associated with $f_1$ detector 17 and two with the $f_2$ detector 18. Looking first to the detector 17, it can be seen to include series resonant and parallel resonant circuits 40 and 41, respectively. These are serially connected with each other and with series resonant circuit 42 and parallel resonant circuit 43, the latter two of which are associated with the $f_2$ detector 18.

The parallel resonant circuit 41 forms part of a signal channel in the detector 17 and is tuned so that it presents a high impedance to signals of frequency $f_1$. All other voice frequencies see a low impedance. Thus, for a given current, the voltage drop across the input winding of transformer 50 associated with the signal channel in detector 17 is large. As a result, the output of transformer cooperates with diode 51, capacitor 52 and resistor 53 to develop a large positive output voltage which appears on lead 19. The guard channel, on the hand, has its series resonant input circuit 40 tuned so that all frequencies other than $f_1$ see a high impedance; hence, the output voltage across transformer 54 cooperates with diode 55, capacitor 56 and resistor 57 to produce a negative output voltage. The reversed hookup of diodes 51 and 55 assures that the signal and guard channels have oppositely poled outputs. The relative values of resistors 53 and 57 are chosen to make the signal channel output dominant whenever a signal frequency $f_1$ is placed on the transmission system. Thus, the signal and guard channels in detector 17 are arranged so that only when frequency $f_1$ appears across the parallel and series resonant circuits is a positive voltage placed on lead 19. It will be remembered that this output is employed to operate trigger circuit 20; a negative voltage on lead 19 will have no effect on the trigger circuit 20.

In a similar manner, series resonant circuit 42 and parallel resonant circuit 43 in detector 18 are tuned to frequency $f_2$. Thus, when the frequency $f_2$ occurs across the parallel resonant circuit 43 of the signal channel, a high impedance is placed across the primary of transformer 60 which cooperates through its secondary with diode 61, capacitor 62 and resistor 63 to provide a relatively large positive output voltage on lead 21. Since the series resonant circuit 42 in the guard channel is tuned to provide a high impedance for all frequencies other than the frequency $f_2$, a high impedance is placed across the primary of transformer 64 when they are detected. Transformer 64 cooperates with oppositely poled diode 65, capacitor 66 and higher-valued resistor 67 to provide a negative pulse on lead 21 as a result. The sum of these two pulses results in a positive pulse being placed on lead 21 only when frequency $f_2$ is present.

The circuit components in both detectors are chosen so that when their respective tuned frequency occurs, the positive voltage output on lead 19 or 21, as the case may be, is greater than that of the negative guard output. Thus, whenever frequency $f_1$ is detected, a positive pulse will be delivered over lead 19 to change the state of the trigger circuit 20 if it is in its other equilibrium position, and whenever frequency $f_2$ is detected, a positive pulse will be delivered over lead 21 to change the equilibrium position of the trigger circuit 20.

The trigger circuit 20 is disclosed in block diagram and need not be discussed in any great detail since any number of conventional bistable trigger circuits or flip-flops will serve the purpose. In the present case, the conventional Eccles-Jordan vacuum tube circuit will work perfectly well. The lead 19 would control the grid of one of the two tubes and the lead 21 would control the other grid. Whenever a positive pulse appears on the grid connected to lead 19 it will cause the tube to conduct and cutoff the tube associated with lead 21, and whenever a positive pulse appears on the grid to which is connected lead 21, it will cause that tube to conduct and cutoff the tube associated with lead 19.

Whenever the flip-flop circuit 20 is triggered so that the tube associated with lead 19 is conducting, the plate of that tube completes a circuit for its operation, which circuit includes battery 23. Thus, with the flip-flop circuit 20 so controlled, each time the presence of the frequency $f_1$ is detected, relay 22 is operated and each time the frequency $f_2$ is detected, the flip-flop circuit 20 causes relay 22 to release. Relay 22 in operating places battery 24 over its front contact on output lead 25 and, upon the release of relay 22, the same contact opens to remove battery 24 from output lead 25. As will be noted from examining FIG. 5, the output voltage appearing on lead 25 is substantially a duplicate of the input signal voltage applied to lead 34. As a result, a system is provided whereby input direct-current pulses from the conventional switching equipment of office A are converted to alternating-currents of selected frequencies for transmission any desired distance in the voice channel to remote points where they are reconverted to duplicate direct-current signaling pulses supplied to the conventional switching equipment of office B.

The gate circuit 10 of the present dual-frequency inband signaling system is not described in detail since any number of conventional gates might appropriately be used without departing from the scope of the invention. For example, to take a most conventional case, the outputs on lead 11 and 12 might be utilized to operate relays which in turn would place the proper oscillator 14 or 15 across the lines T and R. Alternatively, the output pulses on 11 and 12 might energize a balanced bridge which in turn would place oscillator 14 or 15 across the lines T and R. In designing a gate circuit 10, it is desirable that means be provided to temporarily interrupt the voice frequency path 10–15 milliseconds before the signaling frequencies are placed on the line. This will prevent any unusual bursts of noise from interfering with the beginning of the signaling system. While the signaling frequencies should not materially interfere with the voice transmission, in some applications it may be desirable to interrupt the voice frequencies during the period of signaling. However, this is a matter relating to the transmission characteristics of the voice channels, as opposed to the signaling system. It will vary depending upon the particular voice channels with which the present inband signaling system is used.

With respect to the relay 22 which is used in the exemplary embodiment of the present invention to generate direct-current output pulses corresponding to incoming pulses on leads 34, it is, of course, obvious that the trigger circuit 20 can, if properly proportioned, generate the direct-current pulses in conjunction with a rectifying circuit of some sort. It is apparent, therefore, that circuit 20 and the means for generating the duplicate pulses are largely matters of circuit design and, per se, form no part of the present invention.

While the present invention has been disclosed in accordance with the preferred embodiment, it will be apparent to those skilled in the art that numerous other arrangements can be made without departing from the intended scope of the invention.

What is claimed is:

1. Apparatus for transmitting D.C. supervisory signal pulses between calling and called telephone offices connected by a voice channel, said apparatus comprising means adjacent and connected to the calling office for supplying to the voice channel a signal burst of a fixed first audio frequency responsive to the beginning of each supervisory signal pulse supplied by the calling office, means adjacent and connected to the calling office for supplying to the voice channel a signal burst of a fixed second audio frequency responsive to the ending of each supervisory signal pulse supplied by the calling office, whereby a succession of signal bursts of first and second audio frequencies alternately are produced responsive to a succession of D.C. supervisory signal pulses, the means supplying bursts of said first frequency and the means supplying bursts of said second frequency being interconnected to terminate each burst of each frequency no later than the beginning of the next burst of the other frequency, said bursts having a maximum duration exceeding the normal interval between successive telephone dialing pulses, first and second detecting means adjacent to the called office and connected to receive said bursts from the voice channel, said first detecting means being tuned to respond to bursts of said first frequency only and said second detecting means being tuned to respond to bursts of said second frequency only, bistable trigger means adjacent to the called office and connected to be switched to a first state by said first detecting means responsive to each received burst of said first frequency and connected to be switched to a second state by said second detecting means responsive to each received burst of said second frequency, and further means adjacent to the called office and connected to said trigger means and to the called office for supplying a D.C. supervisory signal pulse to the called office during each occurrence in the first state in said trigger means.

2. Apparatus as in claim 1, the several means adjacent to the calling office comprising a pulse transformer having a primary and a secondary, said primary being connected to receive the supervisory signal pulses supplied by the calling office, whereby said secondary provides a decaying pulse of one polarity responsive to the beginning of each supervisory pulse and a decaying pulse of opposite polarity responsive to the ending of each supervisory pulse, a first audio signal source supplying the first audio frequency, a second audio signal source supplying the second audio frequency, gating means for connecting said first and second signal sources selectively to the voice channel, and means connecting said secondary to control said gating means for transmitting a burst of said first audio frequency to the voice channel during each decaying pulse of said one polarity and transmitting a burst of said second audio frequency to the voice channel during each decaying pulse of said opposite polarity.

3. Apparatus as in claim 1, the several means adjacent to the called office comprising a first series-resonant circuit and a first parallel-resonant circuit both tuned to the first audio frequency, a second series-resonant circuit and a second parallel-resonant circuit both tuned to the second audio frequency, connecting means for supplying signals from the voice channel to said four resonant circuits in series, first rectifying means providing a first trigger voltage proportional to the difference between the signal voltages appearing across said first parallel-resonant circuit and said first series-resonant circuit, second rectifying means providing a second trigger voltage proportional to the difference between the signal voltages appearing across said second parallel-resonant circuit and said second series-resonant circuit, a flip-flop connected to be triggered to a first state by said first trigger voltage and to a second state by said second trigger voltage, and means controlled by said flip-flop for supplying to the called office D.C. supervisory signal pulses substantially duplicating the D.C. supervisory signal pulses supplied by the calling office.

4. Apparatus for transmitting D.C. supervisory signals between calling and called telephone offices connected by a voice channel, said apparatus comprising pulse-forming means adjacent and connected to the calling office for providing first and second sets of decaying pulses responsive to alternately positive-going and negative-going changes in D.C. supervisory signals provided by the calling office, said first set consisting of a pulse for each positive-going change in the supervisory signal and said second set consisting of a pulse for each negative-going change in the supervisory signal, first and second oscillators adjacent to the calling office for supplying first and second audio frequencies respectively, gating means adjacent to the calling office for connecting said first and second oscillators selectively to the voice channel, said gating means being connected to and controlled by said pulse-forming means to supply to the voice channel a burst of the first audio frequency during each pulse of said first set and a burst of the second audio frequency during each pulse of said second set, first and second detecting means adjacent to the called office and respectively tuned to detect the first audio frequency and the second audio frequency, a flip-flop adjacent to the called office, said first detecting means being connected to trigger said flip-flop to a first state responsive to each received burst of the first audio frequency and said second detecting means being connected to trigger said flip-flop to a second state responsive to each received burst of a second audio frequency, and means controlled by said flip-flop for supplying to the called office D.C. supervisory signals substantially duplicating the D.C. supervisory signals supplied by the calling office.

References Cited in the file of this patent

UNITED STATES PATENTS

| | | |
|---|---|---|
| 2,020,953 | McClew | Nov. 12, 1935 |
| 2,299,821 | Horton | Oct. 27, 1942 |
| 2,299,822 | Horton et al. | Oct. 27, 1942 |
| 2,626,996 | Brown | Jan. 27, 1953 |
| 2,765,371 | Fritschi et al. | Oct. 2, 1956 |
| 2,892,896 | Skillman | June 30, 1959 |